(12) United States Patent
Wolfe

(10) Patent No.: US 6,217,014 B1
(45) Date of Patent: Apr. 17, 2001

(54) WORK STOP SYSTEM AND JAW PLATE FOR HOLDING THE SAME

(75) Inventor: Ingo E. Wolfe, Brooklyn Park, MN (US)

(73) Assignee: Kurt Manufacturing Company, Inc., Fridley, MN (US)

( * ) Notice: Subject to any disclaimer, the term of this patent is extended or adjusted under 35 U.S.C. 154(b) by 0 days.

(21) Appl. No.: 09/477,690

(22) Filed: Jan. 6, 2000

Related U.S. Application Data

(62) Division of application No. 08/892,258, filed on Jul. 7, 1997, now Pat. No. 6,029,967.

(51) Int. Cl.⁷ .................................................. B25B 1/00
(52) U.S. Cl. ...................... 269/43; 269/303; 269/283; 269/254 CS; 269/134; 269/315
(58) Field of Search .................. 269/43, 283, 303, 269/136, 134, 280, 254 CS, 315; 403/21, DIG. 4, 138

(56) References Cited

U.S. PATENT DOCUMENTS

| | | | |
|---|---|---|---|
| 3,578,799 | * 5/1971 | Davis | 269/51 |
| 3,810,311 | 5/1974 | Pingel | 33/169 |
| 4,030,718 | 6/1977 | Phillpoff | 269/315 |
| 4,186,916 | 2/1980 | Varga | 269/303 |
| 4,969,637 | 11/1990 | Nishimura | 269/110 |
| 5,018,562 | 5/1991 | Adams | 144/253 |
| 5,052,092 | * 10/1991 | Vallauri et al. | 29/234 |
| 5,078,372 | 1/1992 | Fitzpatrick | 269/282 |
| 5,197,721 | 3/1993 | Ruberg | 269/315 |
| 5,358,364 | 10/1994 | Kall | 409/131 |
| 5,649,694 | * 7/1997 | Buck | 269/43 |
| 5,735,513 | * 4/1998 | Toffolon | 269/43 |
| 6,017,026 | * 1/2000 | Durfee, Jr. | 269/271 |
| 6,029,967 | * 2/2000 | Wolfe | 269/283 |
| 6,053,490 | * 4/2000 | Berchtold | 269/43 |

FOREIGN PATENT DOCUMENTS

| | | |
|---|---|---|
| WO 8908532 | 9/1989 | (AU) . |
| 354 045 | 6/1961 | (CH) . |
| 1 285 418 | 12/1968 | (DE) . |
| 0 126 794 | 12/1984 | (EP) . |

\* cited by examiner

*Primary Examiner*—Stephen F. Gerrity
*Assistant Examiner*—Lee Wilson
(74) *Attorney, Agent, or Firm*—Westman, Champlin & Kelly, P.A.

(57) ABSTRACT

A work stop for use on a machine vise is received in a jaw plate for such vise and is securely locked in position. The work stop is fixed in a groove that is machined into a top edge of the jaw plate or jaw, with a member extending over the edge of the jaw plate and adjacent the face of the jaw plate that is used for clamping, a workpiece. This permits the workpiece to be slid against the stop before being clamped. The jaw plate is removably mounted onto a fixed jaw, and is located precisely relative to the fixed jaw so that the jaw plate with the work stop attached can be removed, and then replaced when the same part is to be machined again.

8 Claims, 10 Drawing Sheets

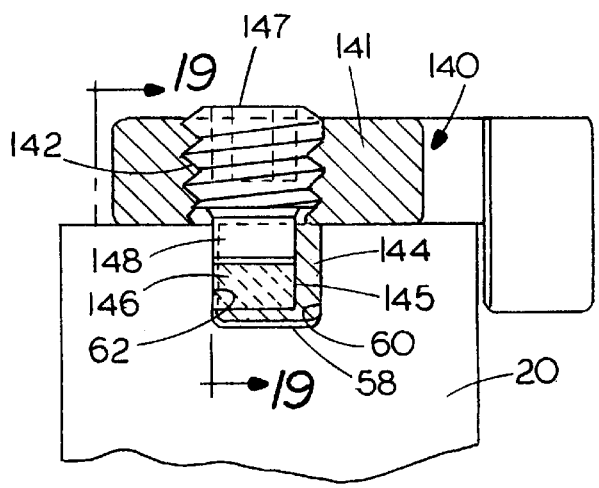
FIG. 18
FIG. 19
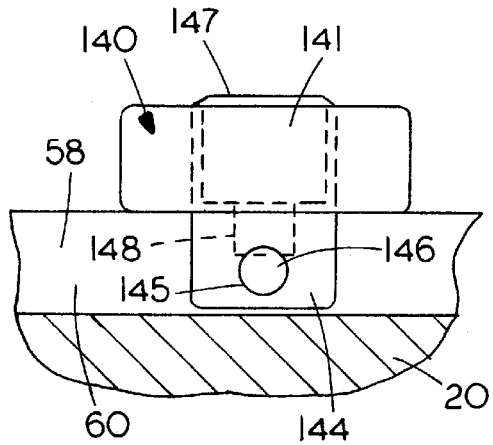
FIG. 20
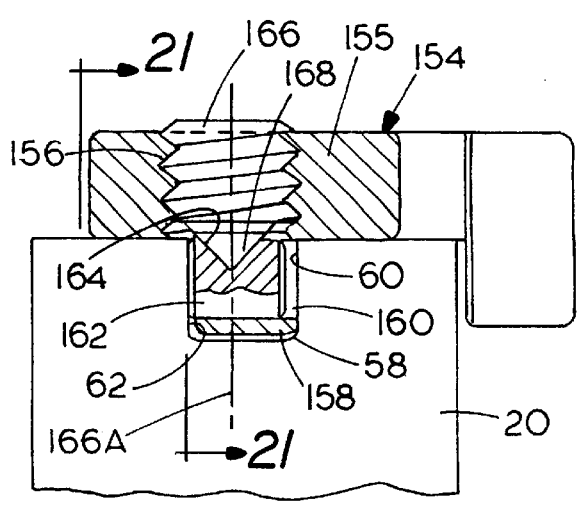
FIG. 21
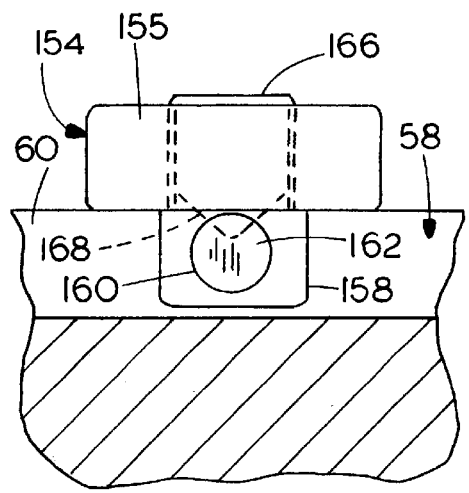

US 6,217,014 B1

WORK STOP SYSTEM AND JAW PLATE FOR HOLDING THE SAME

This application is a divisional of application Ser. No. 08/892,258 filed on Jul. 7, 1997 which is now U.S. Pat. No. 6,029,967.

BACKGROUND OF THE INVENTION

The present invention relates to a work stop that can be positively positioned on a jaw plate of a vise using a groove provided in the top edge of the vise. The work stop has two parts that are expandable in dimension relative to the side surfaces of the groove to positively clamp the work stop in position. The jaw plate may be removable and includes locators so it is precisely positioned in its location when it is replaced.

Work stops have long been used, particularly in machining operations utilizing machine vises. Generally speaking, these stops are clamp mounted at a specific spot on the vise and then an adjustable rod that is held in the clamp is used to provide the desired stop position. The clamps generally are relatively cumbersome, and expensive if they are going to be much good.

There have been work stops developed which utilize dove tail slots on a fixed member, and then a mating dove tail block slides in the slot and supports a stop member for forming a work stop. One such device is shown in U.S. Pat. No. 5,018,562. However, with dove tail slots the mating pieces must seat closely for securely latching the two components together.

Thus, the need exists for providing a small, low cost, positive adjustable stop used in combination with a removable jaw plate for increasing the convenience and the speed of changing the work stop setting, and exchanging a clamp jaw plate set up for one workpiece for another jaw plate with a work stop for a different workpiece.

SUMMARY OF THE INVENTION

The present invention relates to a work stop system for use with machine vises. In particular, the work stop system includes an easily adjustable, small, low profile stop member that slides along a groove or slot in the top edge of a jaw plate of a vise and which can be positively locked in position. The locking requires very little movement of the locking members.

The present invention also presents a jaw plate that is used with a parallel sided slot or groove in a top edge that extends in direction along the length of the jaw plate, which direction is transverse to the clamping direction of a vise. The work stop has a body with a first lock portion that fits into the groove in the jaw plate, and a second lock portion also that fits into the groove and mates with the first lock portion so that upon tightening a screw or turning a cam the lock portions expand and the work stop is positively locked against the parallel side surfaces of the groove or slot.

Various forms of locks are shown, including a wedge type lock where a movable wedge portion slides on a wedge surface on the first portion. Cams, expansion lock, and other members that will cause the two lock portions to expand in a direction to engage both of the parallel side surfaces of the slot can be used.

The jaw plates are made with a vise or clamp jaw mounting so that the jaw plates can be removed from the jaw with the work stop left in position, and then later, when the same part is to be again made, the jaw plate can be replaced without changing the positioning of the work stop. The jaw plate is located precisely relative to the mounting jaw.

BRIEF DESCRIPTION OF THE DRAWINGS

FIG. 18 is a side view similar to FIG. 17 showing a further modified form of a locking member for a work stop made according to the present invention;

FIG. 19 is a view taken along line 19—19 in FIG. 18;

FIG. 20 is a side view similar to FIG. 18 showing a further modified form of the locking member for a work stop made according to the present invention; and FIG. 21 is a view taken along line 21—21 in FIG. 20.

DETAILED DESCRIPTION OF THE PREFERRED EMBODIMENTS

Figure 1:
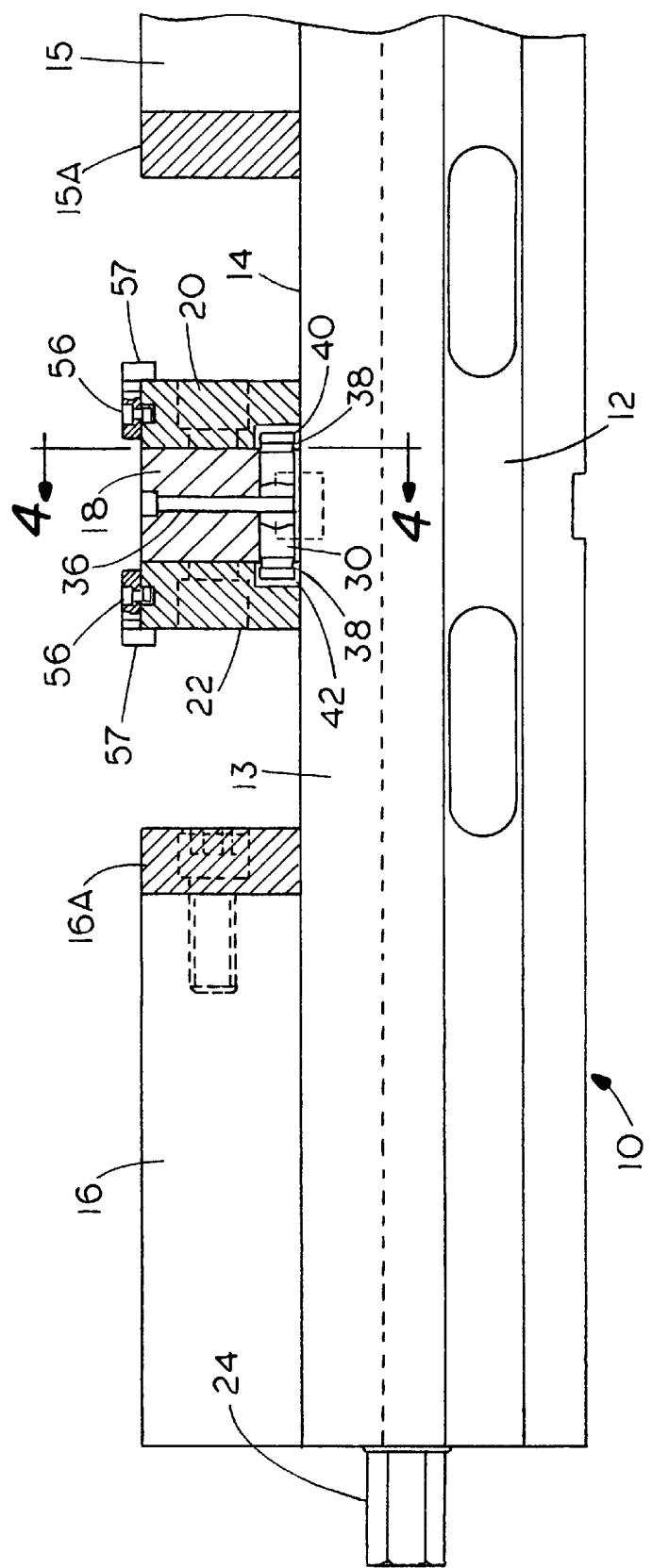
FIG. 1 is a fragmentary side elevational view of a vise having a work stop and a removable jaw plate made according to the present invention installed thereon, with parts in section and parts broken away.

Referring to FIG. 1, a typical machine vise is indicated generally at 10 and includes a vise body 12 that has laterally extending rails 13 with top surfaces 14 that support and guide a first movable jaw 15, and in the form of the vise shown, a second movable jaw 16. The vise shown has a center fixed jaw 18, that is held securely relative to the vise body 12. On each side of the fixed jaw 18 there is a jaw plate 20 and 22, respectively. The jaw plates 20 and 22 face the respective movable jaws 15 and 16, which have jaw plates 15A and 16A, mounted thereon, respectively.

The vise is operated by operating a vise screw 24 to move the two jaws 15 and 16 toward and away from each other simultaneously. The jaw plates 15A and 16A will clamp workpieces against the jaw plates 20 and 22, respectively.

Figure 2:
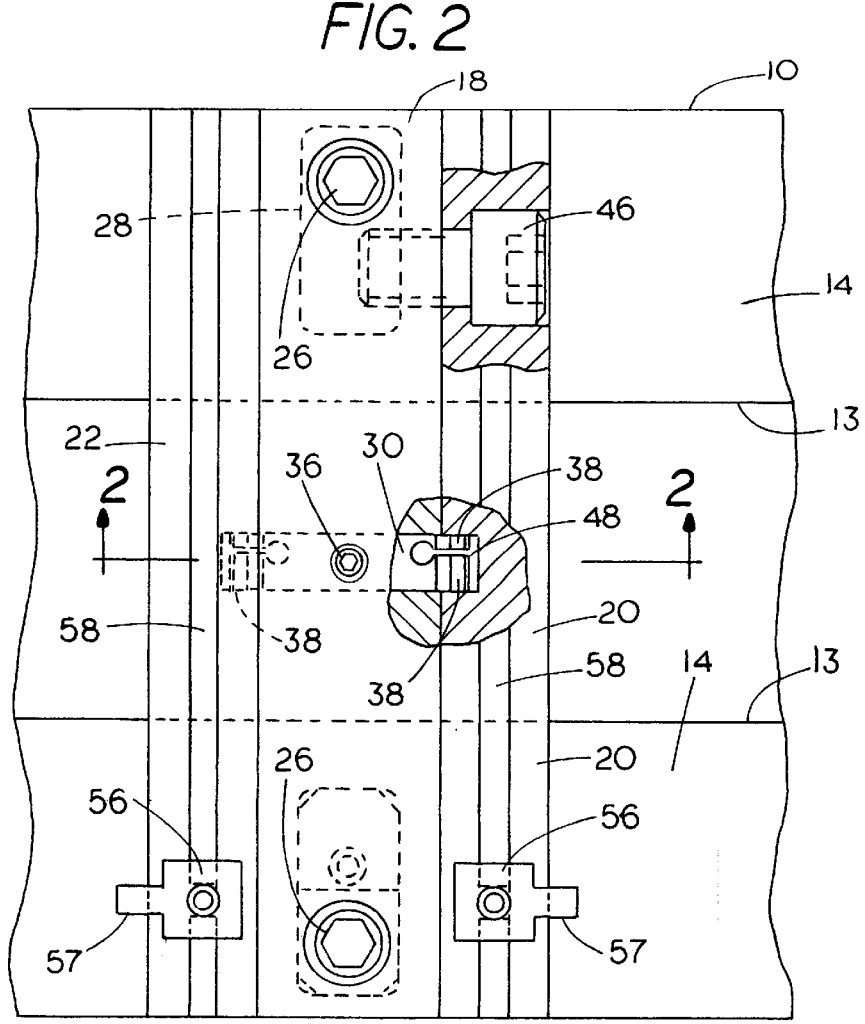
FIG. 2 is a fragmentary sectional view of the jaw shown in FIG. 1 taken generally along line 2—2 in FIG. 3.

The fixed jaw 18 is held in position on the vise body 12 with suitable cap screws 26 as shown in FIG. 2. Also, keys shown in dotted lines at 28 can be used for holding the fixed jaw 18 in position on the vise.

The fixed jaw 18 has a locator cross pin 30 mounted in a centering slot 32 on the lower side of the fixed jaw 18. The locator pin 30 is held positively in place, and has outer ends 38 that extend out from the fixed jaw 18 and which are used for locating the jaw plates 20 and 22.

Figure 4:
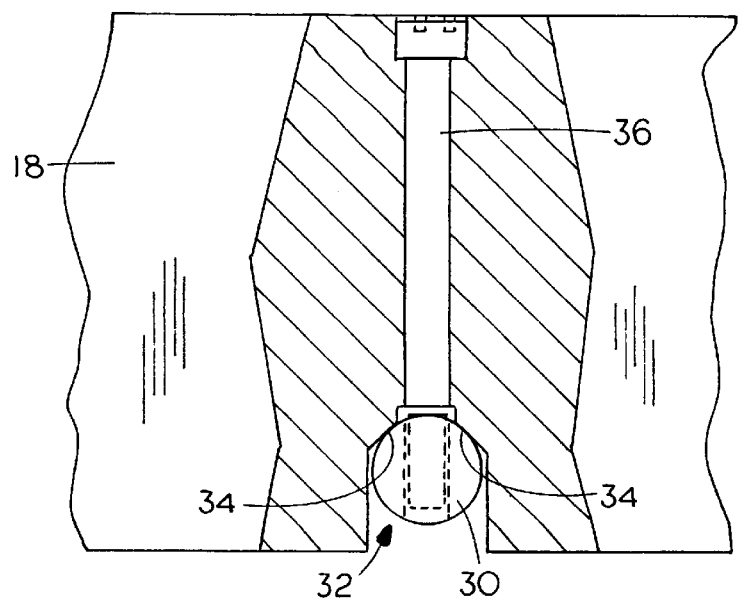
FIG. 4 is a fragmentary side elevational view of a locator region of a vise jaw taken on line 4—4 in FIG. 1.

The cross slot 32 that is formed in the lower edge of the fixed jaw is shown in FIG. 4. The slot 32 has inwardly tapered end surfaces 34 near its inner or upper end to form a "V" seat for pin 30. The surfaces are angled so that the locator pin 30 has line contact along the surfaces 34 when the pin is seated and will center on the surfaces 34. The pin 30 has clearance at the upper end of slot 32. The locator pin 30 is pulled up against the surfaces 34 using a pull bolt 36 that has a head in a recess in the upper surface of the fixed jaw 18 and which threads into a threaded bore in the locator pin 30. The locator pin 30 end portions 38, 38 protrude out beyond the side surfaces of the fixed jaw 18, and the end portions are received in locator slots 40 and 42 in the jaw plates 20 and 22, respectively.

Figure 5:
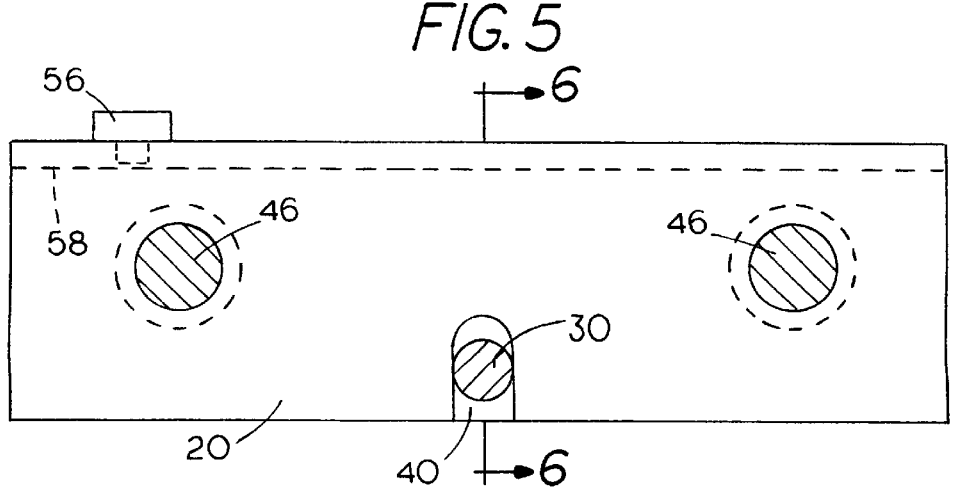
FIG. 5 is a side elevational view of a jaw plate taken generally along line 5—5 in FIG. 2.
Figure 6:
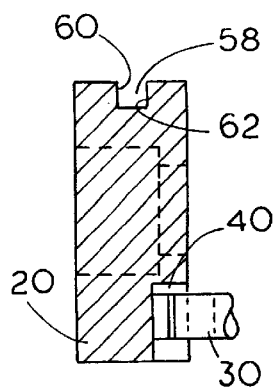
FIG. 6 is a sectional view taken as on line 6—6 in FIG. 5.

The slots 40 and 42 are blind slots, and do not extend all the way through the jaw plates 20 and 22. FIGS. 5 and 6 show slot 40 typically. The slots 40 and 42 have parallel sides, and are made so that when the jaw plates rest on the surfaces 14 of the vise, there is a clearance at the top end of the slots 40 and 42 relative to the end portions 38 of the locator pin 30.

Figure 3:
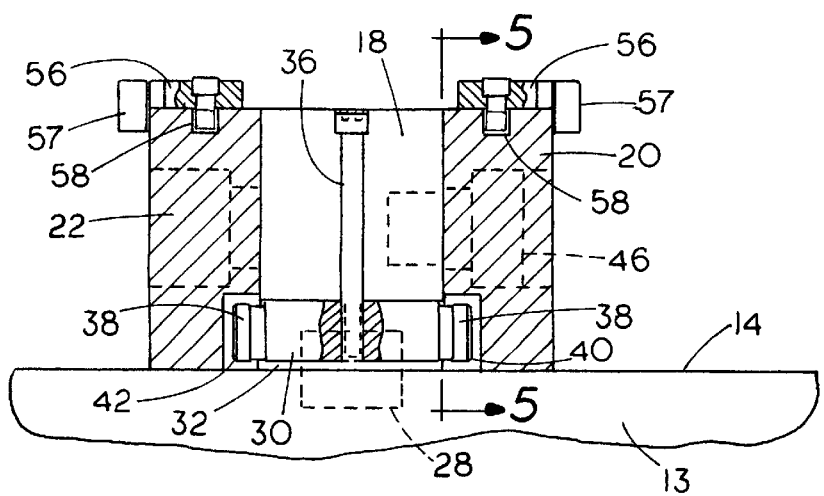
FIG. 3 is a fragmentary top plan view of the fixed jaw shown in FIG. 2.

The jaw plates 20 and 22 are held in place with suitable cap screws that thread into the fixed jaw in a normal manner. Such cap screws are shown schematically at 46 in FIGS. 2, 3 and 5. Jaw plates 20 and 22 can be held against the surfaces of the fixed jaw 18 in any desired manner.

Figure 7:
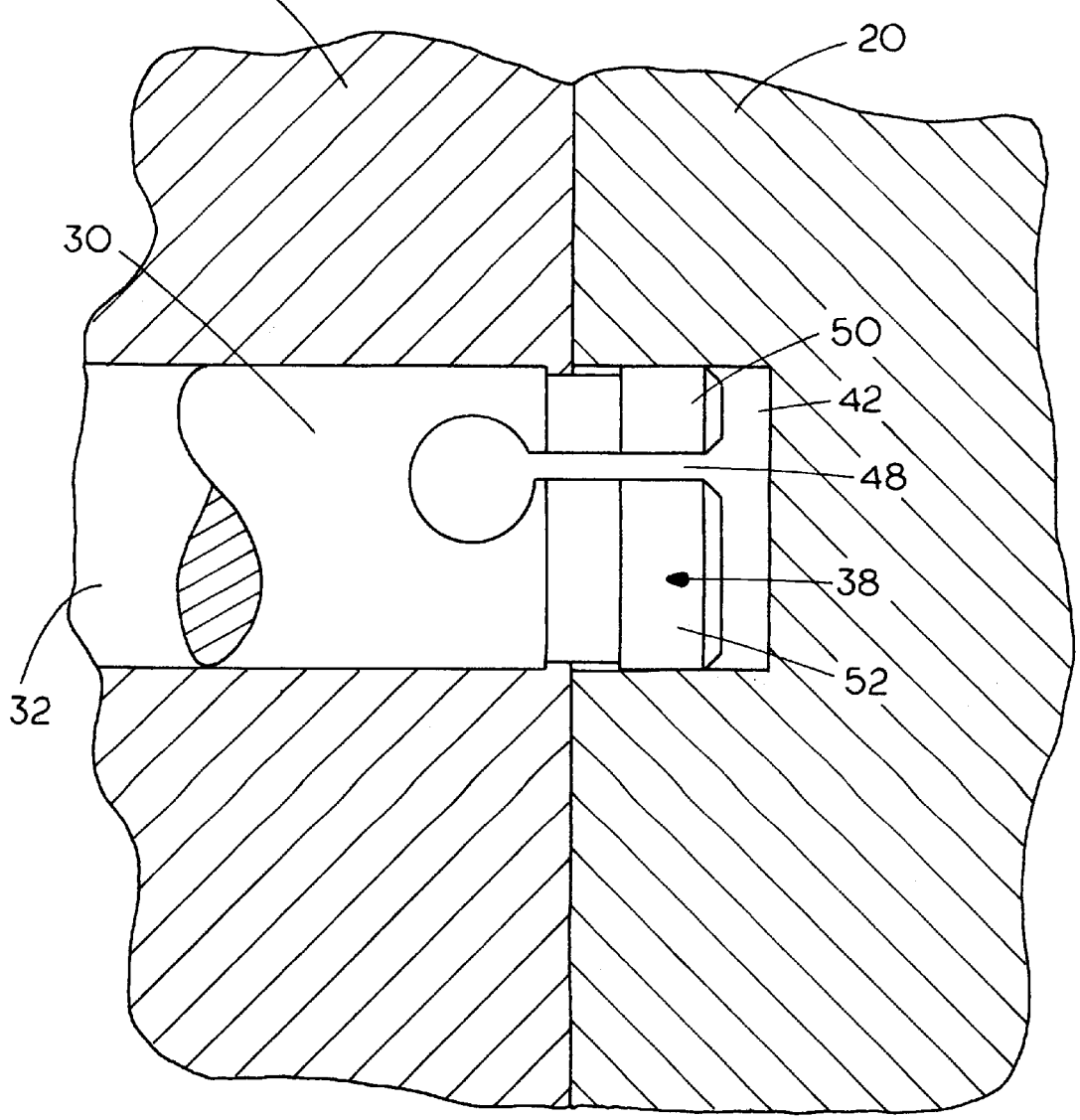
FIG. 7 is an enlarged top view of an end of a jaw plate locator pin with parts in section and parts broken away.

As shown in FIG. 7, each of the end portions 38 of the locator pin 30 have a slit 48 extending parallel to but offset from the pin central axis. The slot 48 extends inwardly from one end of the pin 30 to form a resilient locator portion 50 and a relatively fixed portion 52 of the end 38. The locator portion 50 will move toward the fixed portion 52 under a force and will exert a spring load outwardly. The slots 40 and 42 are made so that their width is less than the outer dimension of the locating pin 30 and specifically less than the locating pin end 38, so that when the jaw plates 20 and 22 are slid down into place against the fixed jaw 18 and over the end portions 38 of the locator pin 30, the jaw plates 20 and 22 cause locator portion 50 to resiliently move as they fit into the slots 40 and 42 and exert a spring load against the one side surface of the slots 40 and 42. The jaw plates are positively positioned laterally in direction of the longitudinal length of the jaw plates. This is the direction transverse to the axis of the movement of the movable jaws of the vise. The spring load from the resiliently loaded locator portion 50 provides a positive seating of the jaw plates 20 and 22, and as will be explained, that permits the jaw plates 20 and 22 to be interchanged with other jaw plates with the work stops set for particular piece parts carried thereon.

Once the jaw plates 20 and 22 are properly located laterally of the vise, the cap screws 46 are threaded into bores in the fixed jaw 18 so that the jaw plates 20 and 22 are securely held against the face of the fixed jaw 18.

A work stop 56 is shown on each of the jaw plates 20 and 22 in FIG. 2. The work stops have stop ends 57 that extend out from the clamp face of the jaw plate and are positioned in a location which provides for a stop for a workpiece to be held in the vise and machined. As shown typically in FIG. 6 for the jaw plate 20, and in FIG. 2, each of the jaw plates has a locator groove or slot 58 therein. The groove or slot has precisely spaced parallel side surfaces 60 and 62 and a bottom surface that joins these side surfaces. The bottom surface is positioned sufficiently deep to form a clearance relative to the holding or lock mechanisms for the work stop 58. The surfaces 60 and 62 are precisely machined parallel to each other and extending along the length of the jaw plates, which is the direction transverse to the direction of jaw movement for clamping.

The work stops 56 can be held in any desired location along the length of these grooves or slots 58, and can be made so that they will extend out beyond the ends of the vise jaws for parts that protrude beyond the sides of the vise.

Figure 8:
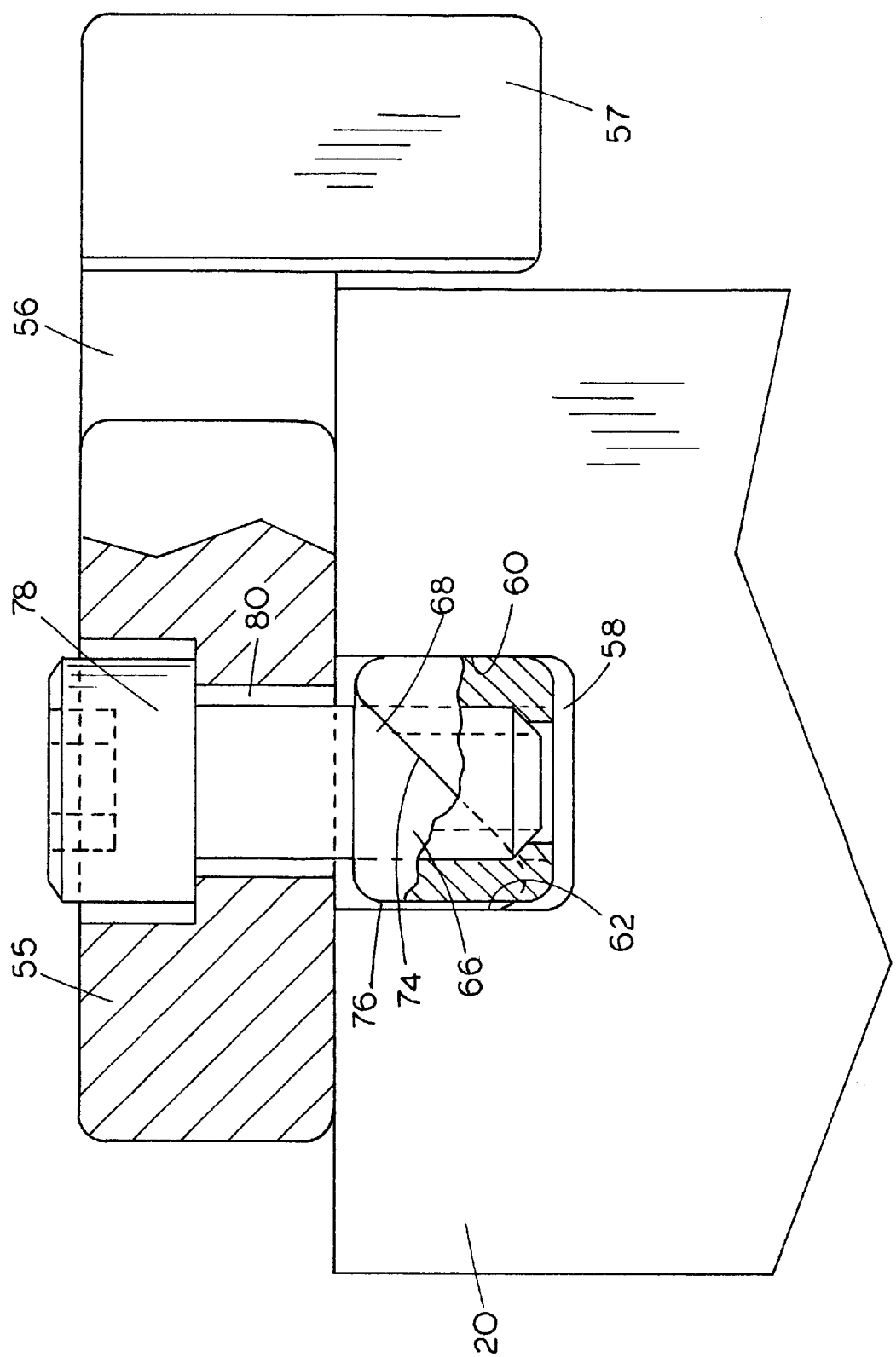
FIG. 8 is an enlarged end view of the jaw plate shown in FIG. 2 showing details of the locking mechanism for a work stop made according to the present invention with parts in section and parts broken away.

FIG. 8 is an enlarged fragmentary view of the top end of the jaw plate 20 and shows a work stop 56 in position. The slot or groove 58 is shown, and it can be seen that the work stop 56 has a pair of spaced apart fixed lock members 66 (see also FIGS. 9, 10 and 11) that fit into the slot 58. The lock members 66 have inclined wedge surfaces 68 on one side and vertical side surfaces 70 opposite from the inclined surfaces.

Figure 9:
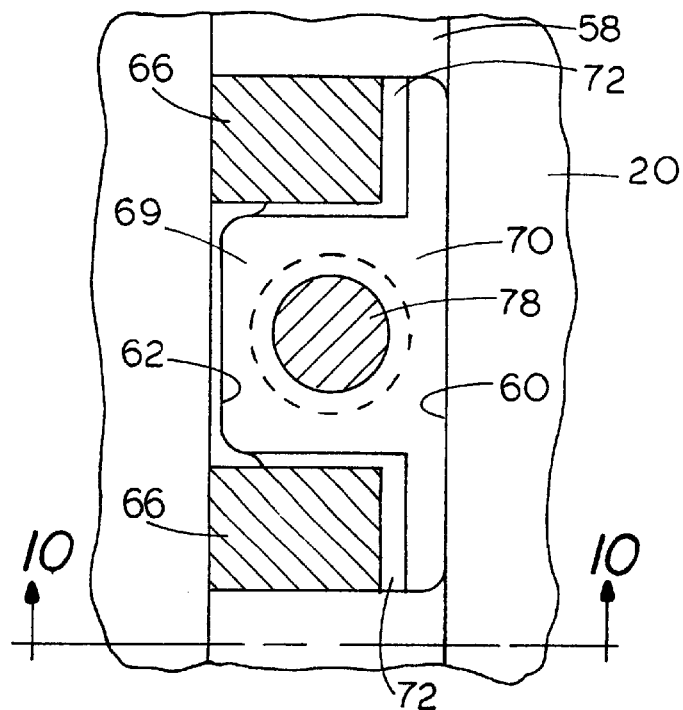
FIG. 9 is fragmentary sectional view taken as on line 9—9 in FIG. 8.
Figure 10:
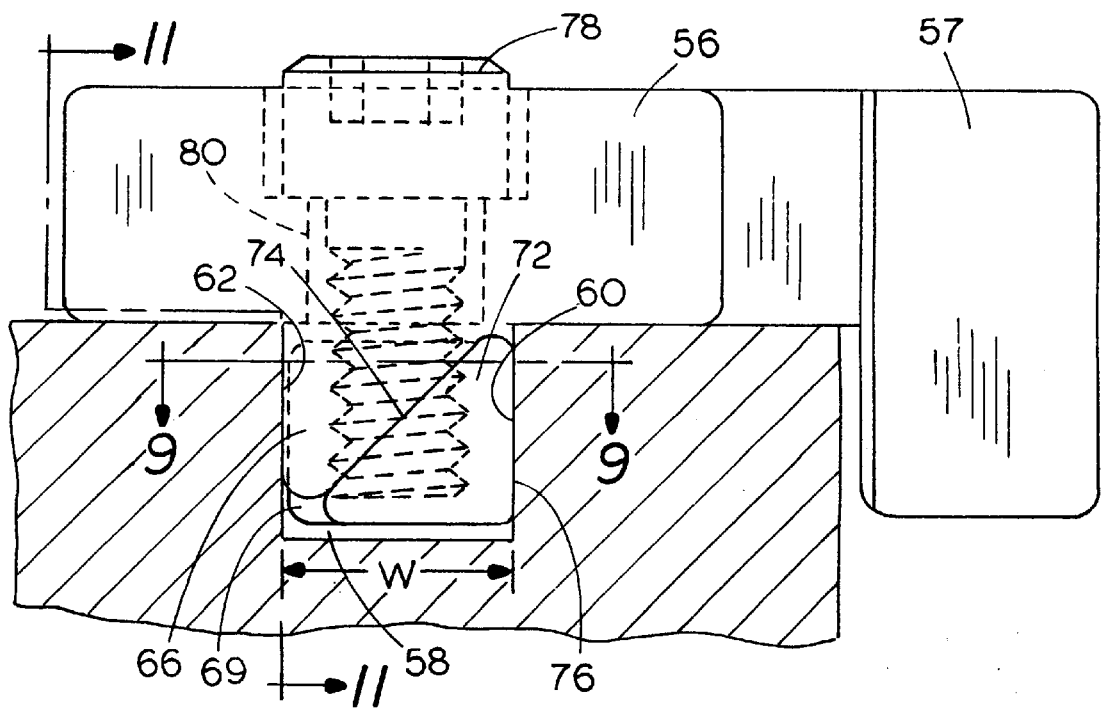
FIG. 10 is a fragmentary view taken along line 10—10 in FIG. 9.
Figure 11:
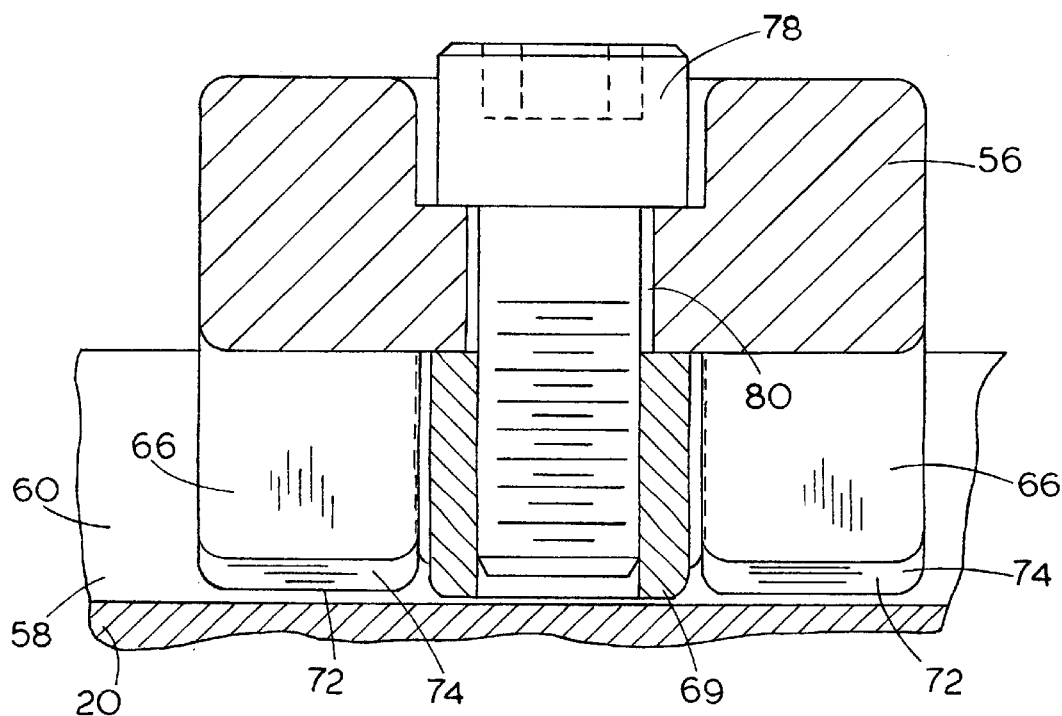
FIG. 11 is a view taken generally along line 11—11 in FIG. 10 with parts in section and parts broken away.

As can be seen in FIGS. 9 and 11, the fixed lock members 66 are on opposite ends of the work stop body 55, and the lock members 66 are spaced apart in the center sufficient to receive a tongue 69 of a movable lock member or portion 71. Movable lock member 71 has outwardly extending wedges 72 on opposite sides of its center line, and the wedges 72 have upwardly facing inclined surfaces 74 which align with and mate with the surfaces 68 on fixed lock members 66. This can perhaps best be seen in FIG. 9, where the lock members 66 have been broken away, and are shown overlying partially the inclined surfaces 74 of the wedges 72.

The lock member 71 also has a vertical side surface 76 that is adjacent to and will engage the side surface 60 of the slot 58.

A cap screw 78 is positioned in the body 55 of the work stop 56, and extends through a bore 80 to be threaded into a threaded opening in the tongue portion 69 of the movable lock member 71. When the cap screw 78 is tightened, the wedge surfaces 68 and 74 will engage and slide, tending to expand the overall width of the member represented in FIG. 10 at W, thereby tightening the lock members to cause wedging so the surfaces 70 and 76 expand against the surfaces 60 and 62 of the slot 58.

Thus a work stop 56 can be slid along the length of the slot 58 of either one of the jaw plates, and clamped in place by tightening the screw 78 to form the wedge locking arrangement caused by the surfaces 70 and 76 that expand laterally to hold the work stop positively in position.

Figure 12:
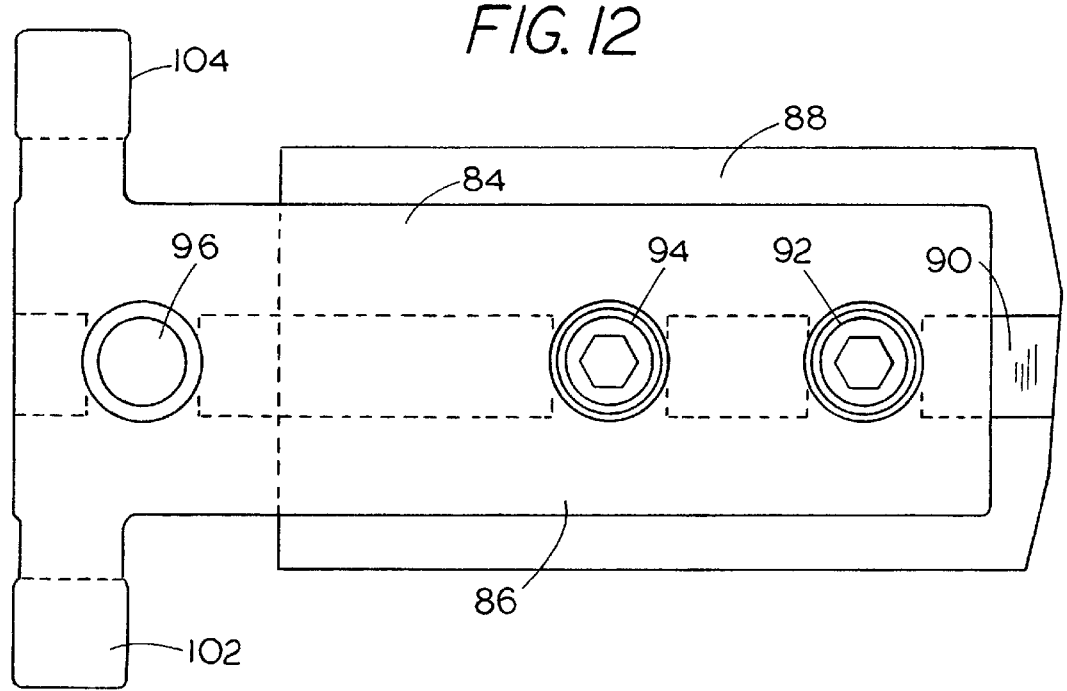
FIG. 12 is a top plan view of a modified work stop made according to the present invention.
Figure 13:
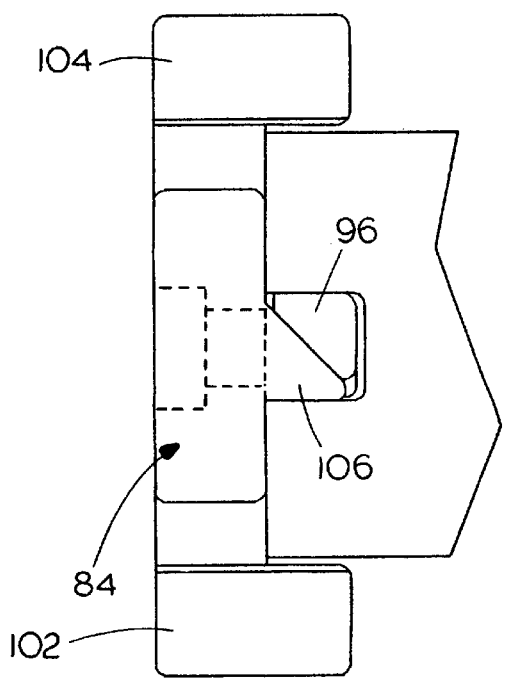
FIG. 13 is an end elevational view of the device of FIG. 12.
Figure 14:
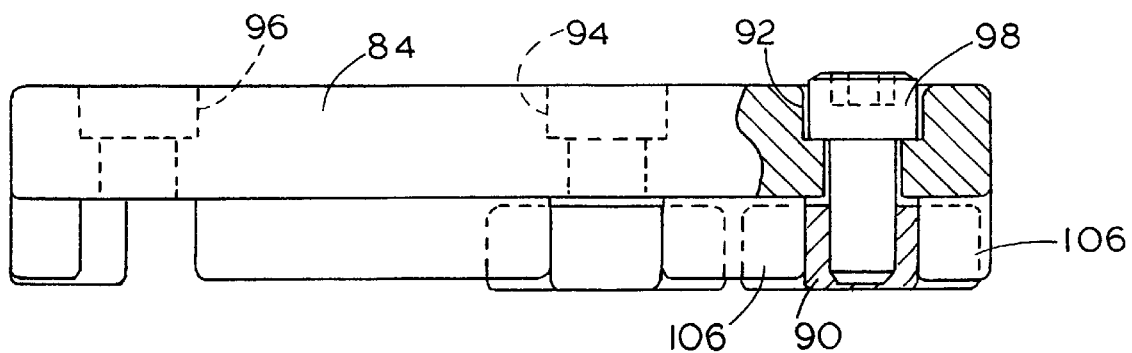
FIG. 14 is a side view of the device of FIG. 12 with parts broken away.

As stated, the work stop 56 can be left in position for a particular part and the jaw plate removed, and when the same part is to be machined the jaw plate can be replaced because of the precise locating arrangement laterally using locator pin 30 as well as against the surface of the fixed jaw 18.

Where a work stop needs to be beyond the sides of the vise because of the size of the workpiece, a work stop such as that shown in FIGS. 12, 13 and 14 can be utilized. In this form of the invention, a work stop 84 has an elongated body 86 that lies over top of a jaw plate 88 that has a groove or slot 90 in the top edge.

While not shown in detail, the same type of wedge lock members as shown in the first form of the invention can be utilized in three positions including a first position 92, a second position 94 and a third position 96. By clamping at two positions such as 92 and 94 with a suitable wedge member 96 (see FIG. 13) using cap screws 98, the work stop 84 can be locked positively in position and held in place in the slot as in the previous form of the invention. An outer end of the work stop can protrude beyond an end 100 of the jaw plate 88. In this instance, the work stop body 86 has a pair of work stop lugs 102 and 104 extending in opposite directions from the jaw plate 88. The groove can be in a fixed jaw, such as that shown at 18 so that the lugs 102 and 104 can be used for stopping workpieces on opposite sides of the fixed jaw 18. The work stop lugs can be used as desired. It can also be seen that three stations can be used for locking the work stop 84 in position.

The lock members 96 are the same type as that shown in the first form of the invention. The work stop 84 can have a plurality of the lock members spaced at appropriate locations for providing the expanding members that hold the work stop positioned securely. The work stop 84 can be made to extend either to the right or left of the vise.

FIGS. 15–21 show alternate locking arrangements for use with the work stops of the present invention.

Figure 15:
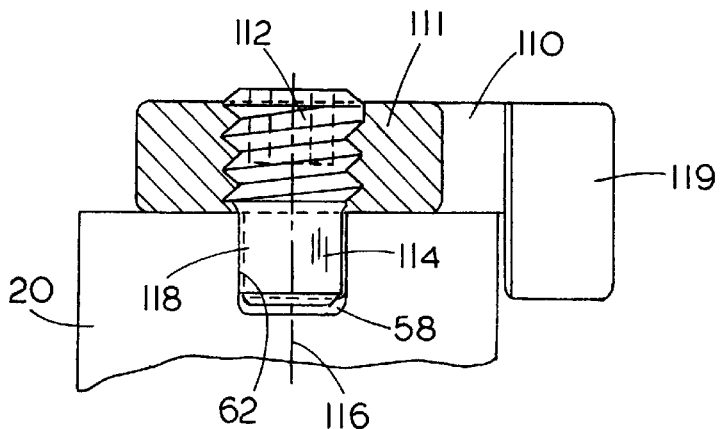
FIG. 15 is a fragmentary side view of a jaw plate with parts in section and parts broken away showing a modified locking arrangement for a work stop mounted on the jaw plate.

Each of the work stops is shown in the jaw plate 20, with the slot 58 in the top edge. As shown in FIG. 15, a work stop 110 has a body 111, and a lock member set screw 112 has a threaded shank threadably mounted in a bore in the center of the body 111. The portion end 144 of the set screw 112 is made eccentric relative to the central axis 116 of the threaded shank, and when the set screw 112 is turned, a cam surface shown at 118 will engage the side surface 62 of the slot or groove and force the opposite side of the end portion 144 against surface 60 to provide a cam lock for the work stop 110. The work stop lug 119 will thus be held securely at a desired position along the jaw plate. Releasing the lock member is accomplished by reversing the rotation of the set screw 112.

Figure 16:
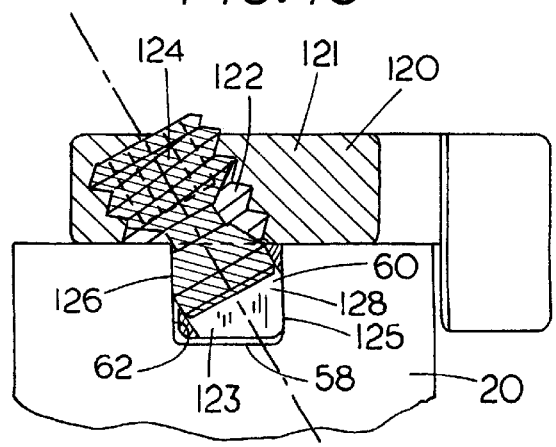
FIG. 16 is a side view of a further modified lock for the work stop of the present invention shown with parts in section and parts broken away.

FIG. 16 shows a further modified form wherein a work stop 120 has a body 121 that has a lock portion 123 that extends into the slot 58. A threaded bore 122 is formed in the body 121 and lock portion 123 with the axis of the bore 122 at an acute angle relative to the plane of the surface 62 of the slot 58. A set screw 124 has an internal cone surface 126 adjacent its inner end and is positioned in the threaded bore 122. The set screw 121 can be loosened (screwed inwardly) so that the cone surface is inside the bore in the lock portion 123. The lock portion 123 and end portion 128 of the set screw can be slipped into the slot 58. The set screw is tightened (drawn upwardly) so that the conical surface 126 will engage the surface 62 and push the lock portion against surface 60 to securely lock the work stop 120 relative to the jaw plate 20. The lock portion 123 has a width along the slot 58 greater than the diameter of the set screw so it has a surface 125 that engages surface 60. the lock portion has a width as shown for the locks in FIGS. 19 and 21. Releasing is accomplished by reversing direction of rotation of the set screw. Only a partial turn of the set screw is needed for locking and releasing.

Figure 17:
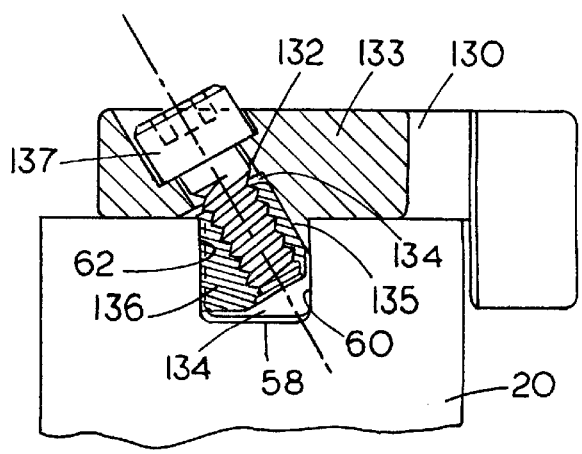
FIG. 17 is a side view of a still further modified locking member for a work stop with parts in section and parts broken away.

In FIG. 17, a modified cam having an action similar to that shown in FIG. 16 is used. The work stop 130 has a countersunk bore 132 in its body 133, and it has a recess 134 defined therein. The body 133 has a lock portion 135 that extends into the slot 58 of the jaw plate 20, and the recess 134 extends into the lock portion and slidably receives a locking wedge member 136. The locking wedge member is positioned so it will partially extend into the slot 58 adjacent surface 62. The recess 134 is open to that side so the wedge member 136 can move out of the lock member 135 to engage surface 62. The lock member 135 also has a lateral width along slot 58.

A cap screw 137 is used for tightening the wedge member 136 upwardly and when this is done, the wedge member 136 will engage the side surface 62 of the slot 58 and cause an expanding force with the opposite side of the lock portion 135 including a lip portion 135 that extends into the slot 58, and the surface along the lateral width engaging surface 62. The wedge member 136 will securely hold the work stop 130 in position.

In FIGS. 18 and 19, a further modified form of the invention is shown for holding a work stop 140 in position. The work stop 140 has a body 141 in which a threaded bore 142 is formed. In addition, the body 141 has a housing structure 144 that extends down into the slot 58 and forms a lock portion. As can be seen in FIG. 19, housing 144 has an interior chamber 145. The chamber 145 has parallel side walls and is open to the surface 62 when the work stop is positioned in the slot 58. A compressible rubber block 136 is positioned in the chamber 145 near the lower end of the chamber, and a set screw 147 is threaded into the bore 143. The set screw has an end 148 that fits into the chamber 145 and bears against the rubber block 146. When the set screw 147 is tightened, the rubber block 146 will tend to expand outwardly in direction toward the surface 62 and will cause the work stop to be held securely by expanding the lateral dimension of the lock portion 144 and a movable lock portion comprising the expanding rubber block 146. The block 146 and lock portion 144 engage the surfaces 62 and 60 of the slot 58 for locking.

FIGS. 20 and 21 show a further modified form of the work stop lock of the present invention. In this form of the invention, a work stop 154 has a body 155, and a threaded bore 156 through the body. The body 155 also has a lower lock housing 158 extending into the slot 58 of the jaw plate 20, and the body 158 is slightly narrower than the space between the surfaces 60 and 62 of the slot 58. Lower lock body 158 has a bore 160 therethrough, transverse to the slot and opening to both the surfaces 60 and 62, as shown. A cam plunger 162 is mounted in bore 160, and it has a conical seat 164 at an upper side thereof that aligns with the bore 156 in the body 155.

A set screw 166 is threaded into the bore 156 and has a cone end 168 that fits into the conical recess 164. As can be seen, the center line 166A of the set screw 166 is off set from the center of the lock body 158 and offset from the center of the conical seat 164. The cone end 168 of the set screw thus will bear against one side of the conical shaped seat 164 and will force the plunger 162 against the surface 62. The opposite end of the lock body 150 will bear against the surface 60 of the slot 58 to cause a positive lock to occur.

The system design allows positioning workpieces repeatably into a vise locating the workpiece or multiple workpieces with a minimum of accessories and allows mounting the vises in close proximity to each other without interference from the work stop. The work stops are contained within the "foot print" of the vise unless the work stop is needed for an extended part.

When quick change over jaw plates are desired for economics of operation, it is also possible to keep the work stop attached to the jaw plate being removed and stored until there is a future set up for the same part. The design allows jaw plates to be used that are no higher than the stationary jaw on which the jaw plates mount. The standard work stop is designed small enough in width so as it does not consume as much of the usable jaw clamping surface as existing work stops, and can be used to locate parts on either the right or left edge. The sides of the work stop bodies are ground parallel.

The special stops for longer parts can be made for either right or left-hand extension, as desired.

The work stop will be usable on all jaw sizes, so long as the jaw has a groove, and can be used on fixed jaws or on jaw plates as shown.

The jaw plate locator pin on the fixed jaw is positioned, located on the fixed jaw, and the resilient end portion of locator pin will cause the jaw plate to be located and referenced against one side of the provided slot, to positively position the jaw plate laterally. The jaw plate is held securely against the face of the stationary jaw for insuring that it is vertical.

A minimum number of tools are necessary for operating the work stop. Generally only an Allen type wrench is needed for operating the work stops, and also for removing and replacing the jaw plates.

Although the present invention has been described with reference to preferred embodiments, workers skilled in the art will recognize that changes may be made in form and detail without departing from the spirit and scope of the invention.

What is claimed is:

1. A combination of a vise and jaw plate comprising a fixed jaw on the vise having a mounting surface thereon, a locator pin extending from the mounting surface, adjacent a jaw support of the vise, a jaw plate mounted on the fixed jaw and having a plate surface positioned against the mounting surface, and the jaw plate having a locator receptacle comprising a blind slot opening to the plate surface and to an edge of the jaw plate engaging the jaw support of the vise, the locator pin having a spring end portion that fits into the locator receptacle under a spring force urging an edge of the locator receptacle against one side of the end portion.

2. The combination of claim 1, wherein said jaw plate has a second edge spaced from and generally parallel to the edge engaging the jaw support, and a groove formed in the second edge having spaced side walls that are substantially straight and extend a selected distance along the second edge.

3. The combination of claim 1, wherein said spring end comprises a slot formed generally parallel to a longitudinal axis of the pin, and offset from the axis whereby one portion of the end of the pin is deflectable relative to another portion of the end of the pin and will deflect relative to the other portion and exert a resilient force to pull the jaw plate to a position with the edge of the locator receptacle against an outer side of the other portion of the end of the pin.

4. The combination of claim 2 and a work stop having a lock portion adapted to fit into the groove on the second edge, and including a releasable lock for holding the work stop in position along the groove, said work stop having a relatively narrow width and a low profile with a stop member extending out from the jaw plate to overlie a surface thereof opposite from the plate surface.

5. The combination of claim 1, and a receptacle on the fixed jaw for holding the locator pin, said receptacle comprising a downwardly opening slot in the fixed jaw having substantially parallel side surfaces adjacent the edge of the fixed jaw on the jaw support, an inner end of said slot having walls which are substantially planar and tapered toward a center plane of the receptacle in the fixed jaw, the inner end of the receptacle being such that the pin contacts only the planar surfaces for locating the pin in a precise position relative to the fixed jaw, and a fastener for holding the pin against the planar surfaces.

6. The combination of claim 5, wherein said fastener comprises a screw in a bore in the fixed jaw threaded into the pin and tightenable to draw the pin against the planar surfaces.

7. A jaw plate for use in combination with a fixed jaw on a vise having a mounting surface thereon, and a locator pin having a diametrically springable end extending from the mounting surface, the jaw plate having a plate surface complementary to the mounting surface, and the jaw plate having a locator receptacle at one edge comprising a closed end slot having spaced side walls opening to the plate surface and to the one edge of the jaw plate, the slot having a width slidably receive the locator pin springable end with the springable end exerting a spring force against the side walls of the locator receptacle.

8. The jaw plate of claim 7, wherein said jaw plate has a second edge spaced from and generally parallel to the one edge, and a groove formed in the second edge having spaced side walls that are substantially straight and extend a selected distance along the second edge.

* * * * *

UNITED STATES PATENT AND TRADEMARK OFFICE
CERTIFICATE OF CORRECTION

PATENT NO. : 6,217,014 B1                              Page 1 of 1
DATED      : April 17, 2001
INVENTOR(S) : Ingo E. Wolfe It is certified that error appears in the above-identified patent and that said Letters Patent is hereby corrected as shown below:

<u>Column 8,</u>
Line 40, after "width" and before "slidably" insert -- to --.

Signed and Sealed this

Thirtieth Day of April, 2002

Attest:

Attesting Officer

JAMES E. ROGAN
Director of the United States Patent and Trademark Office